United States Patent
Suzuki

(10) Patent No.: US 8,284,312 B2
(45) Date of Patent: Oct. 9, 2012

(54) VIDEO DISPLAY DEVICE, VIDEO DISPLAY SYSTEM, AND VIDEO DISPLAY METHOD

(75) Inventor: Shinobu Suzuki, Takasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1202 days.

(21) Appl. No.: 11/808,343

(22) Filed: Jun. 8, 2007

(65) Prior Publication Data

US 2008/0151119 A1    Jun. 26, 2008

(30) Foreign Application Priority Data

Dec. 22, 2006  (JP) .................................. 2006-346397

(51) Int. Cl.
*H04N 5/50* (2006.01)
*H04N 7/173* (2006.01)
*H04N 7/18* (2006.01)
*G06F 3/00* (2006.01)

(52) U.S. Cl. ............... 348/569; 725/109; 725/74; 710/8

(58) Field of Classification Search ........................ None
See application file for complete search history.

(56) References Cited

U.S. PATENT DOCUMENTS

2005/0080939 A1* 4/2005 Onuma et al. .................... 710/8
2005/0160468 A1* 7/2005 Rodriguez et al. ............ 725/109

FOREIGN PATENT DOCUMENTS

| JP | 11-015425 | 1/1999 |
| JP | 2000-194346 | 7/2000 |
| JP | 2004-102067 | 4/2004 |
| JP | 2004-333932 | 11/2004 |
| JP | 2005-175570 | 6/2005 |

* cited by examiner

*Primary Examiner* — Jefferey Harold
*Assistant Examiner* — Sean Haiem
(74) *Attorney, Agent, or Firm* — Pillsbury Winthrop Shaw Pittman, LLP

(57) ABSTRACT

A video display system is a system in which a video transmission device 10 and a video display device 20 are connected via an HDMI 1. The video display device 20 includes an EDID memory 25 in which display side recognition data in plural formats are stored and one of them is set as an initial read data, a response unit 23 replying an HPD for a connection signal (power+5 V) inputted from the video transmission device 10 via the HDMI 1 and the initial read data of the EDID memory 25, and a control unit 24 resetting an output of the HPD after replacing the initial read data into the data of the EDID memory 25 in another format when a display recognition command from a remote controller 30 is accepted.

11 Claims, 5 Drawing Sheets

VIDEO DISPLAY DEVICE, VIDEO DISPLAY SYSTEM, AND VIDEO DISPLAY METHOD

CROSS-REFERENCE TO THE INVENTION

This application is based upon and claims the benefit of priority from the prior Japanese Patent Application No. 2006-346397, filed on Dec. 22, 2006; the entire contents of which are incorporated herein by reference.

BACKGROUND OF THE INVENTION

1. Field of the Invention

The present invention relates to a video display device, a video display system, and a video display method connected to a video transmission device such as, for example, a DVD player, digital tuner, and game machine via a digital interface such as an HDMI or DVI.

2. Description of the Related Art

In equipments equipped with a digital interface such as an HDMI, DVI, they have a mechanism that a video transmission device reads in an EDID (Extended Display Identification Data) of a video display device by using a DDC line (Display Data Channel line), reads displayable video format information of the video display device written in the EDID, and transmits a video signal being compatible with a video format which is set in the video transmission device from among these formats when the video transmission device and video display device are connected.

As a conventional art, there is an art in which a display mode of a system device is switched by performing a switching control of resolution, synchronous frequency for the system device from a display device side by providing an "on screen display mode" (OSD mode) at the display device, and activating this OSD mode in addition that the system device reads an EDID data one-sidedly from a display device by using a DDC control signal (for example, refer to JP-A 11-15425 (KOKAI)).

SUMMARY OF THE INVENTION

However, when nothing is displayed on the video display device in an initial connection procedure, the problem is not solved because even the OSD mode cannot be used even in a case when the above-stated art is applied.

The present invention is made to solve such problems, and an object thereof is to provide a video display device, video display system, and video display method capable of executing a display automatic detection procedure again with a different setting when the display automatic detection procedure is failed at the time when a video transmission device and video display device are connected via a digital interface.

A video display device according to an aspect of the present invention which is connected to a video transmission device via a digital interface, includes: a memory storing display side recognition data in plural formats corresponding to a format of a display data at the video transmission device side, and setting one of the display side recognition data as an initial read data; a response unit replying a response signal for a connection signal inputted from the video transmission device via the digital interface, and the initial read data of the memory; an accepting unit accepting a display recognition command inputted from external; and a control unit resetting an output of the response signal for the response unit after rewriting the initial read data into the display side recognition data in another format stored in the memory when the display recognition command is accepted by the accepting unit.

A video display system according to an aspect of the present invention in which a video transmission device and a video display device are connected via a digital interface, wherein the video transmission device includes: a transmission side control unit transmitting a connection signal via the digital interface, and transmitting a compatible video data to the video display device from among the video data set in a memory at a transmission side in accordance with a replied response signal and display side recognition data, and wherein the video display device includes: a memory at a display side storing the display side recognition data in plural formats corresponding to a format of the video data at the video transmission device side, and setting one of the display side recognition data as an initial read data; a response unit replying a response signal for a connection signal inputted from the video transmission device via the digital interface, and the initial read data of the memory at the display side; an accepting unit accepting a display recognition command inputted from external; and a display side control unit resetting an output of the response signal for the response unit after rewriting the initial read data into the display side recognition data in another format stored in the memory at the display side when the display recognition command is accepted by the accepting unit.

A video display method according to an aspect of the present invention in a video display system in which a video transmission device and a video display device are connected via a digital interface, the video display method includes: transmitting a connection signal from the video transmission device via the digital interface; replying, by the video display device, a response signal for the connection signal received via the digital interface, and one data which is set in advance from among display side recognition data in plural formats stored in a memory at a display side as an initial read data corresponding to a format of a video data at the video transmission device side; transmitting, by the video transmission device, a compatible video data to the video display device from among the video data set in a memory at a transmission side in accordance with the received response signal and initial read data; accepting, by the video display device, a display recognition command inputted from external; and resetting an output of the response signal after rewriting the initial read data into the display side recognition data in another format stored in the memory at the display side when the display recognition command is accepted.

DESCRIPTION OF THE EMBODIMENTS

Hereinafter, embodiments of the present invention are described with reference to the drawings.

Figure 1:
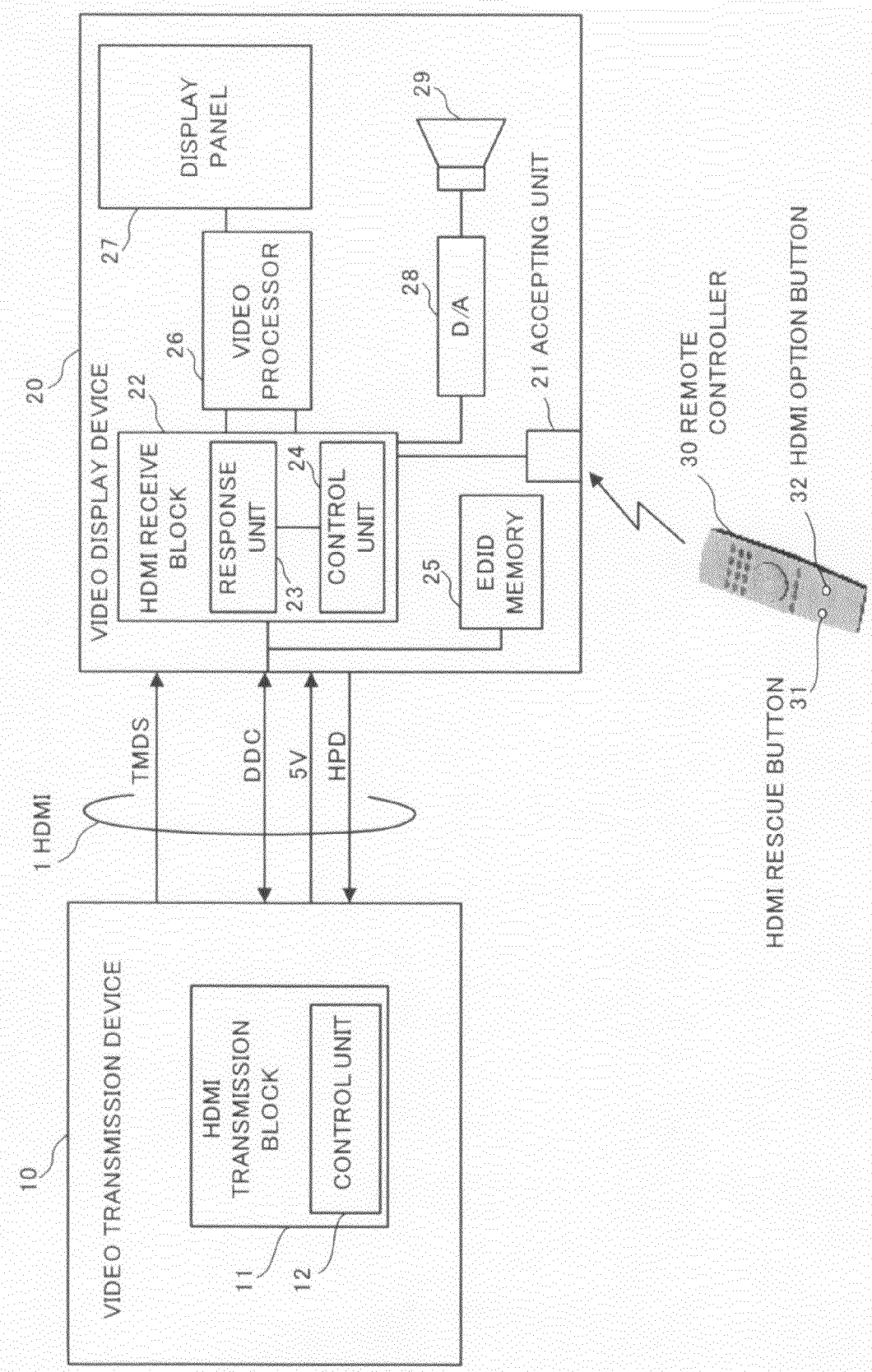
FIG. 1 is a view showing a configuration of a video display system according to an embodiment of the present invention.

FIG. 1 is a block diagram showing a configuration of a video display system according to an embodiment of the present invention.

As shown in FIG. 1, the video display system is a system in which a video transmission device 10 and a video display device 20 are connected via a High Definition Multimedia Interface 1 (hereinafter referred to as "HDMI 1").

The HDMI 1 is a digital signal transmission standard of video and sound, and used for a signal transmission between the video transmission device 10 compatible with the HDMI (DVD player, D-VHS recorder, set top box, camcorder, and so on) and the video display device 20 (TV, monitor, and so on).

A TMDS line (Transition Minimized Differential Signaling line), 5 V_power line, Hot Plug Detect line (HPD line), DDC line (Display Data Channel line), CEC line, and so on are included in the HDMI 1.

In the TMDS line, signals of video, sound, and so on are transmitted from the video transmission device 10.

The DDC line has approximately a similar specification to I2C, and a reading of an EDID (Extended Display Identification Data) data to the video transmission device 10 and an HDCP certification are performed.

The EDID is a parameter showing a specification and characteristics of a monitor, and it is a display side recognition data in the present embodiment.

Receiving formats of video data and sound data inputted to the HDMI 1 are as follows.

Video: 1920×1080p, 1920×1080i, 1280×720p, 640×480p, 720×480p, 720×480i, 1440×480p (repl) (PAL category addition: 720×576p, 720×576i, 1440×576p (repl))

Sound: linear PCM, 2 ch (stereo), Fs=48 kHz/44.1 kHz/32 kHz, bit length=24 bit/20 bit/16 bit A transmission block 11 having a control unit 12 is provided at the video transmission device 10.

The control unit 12 is realized by, for example, a central processing unit (hereinafter referred to as "CPU") and a memory storing programs to make the CPU execute processes.

The control unit 12 transmits a corresponding display data stored in the memory in accordance with a display side recognition data obtained from the video display device 20 via the DDC line of the HDMI 1.

This memory is called as a memory at a transmission side.

The video display device 20 includes an HDMI receive block 22, an EDID memory 25 as a memory at a display side, a video processor 26, a display panel 27, a digital analog converter 28 (hereinafter, referred to as "D/A 28"), and a speaker 29.

Besides, the video display device 20 receives and accepts an instruction command transmitted from a remote controller 30.

The remote controller 30 is, for example, a TV remote control including an infrared communication function.

An HDMI rescue button 31, an HDMI option button 32, and so on are provided at the remote controller 30 as buttons for instruction command transmission in addition to buttons for normal TV operation such as, for example, a channel switching button, a volume increase/decrease button.

The remote controller 30 transmits a display recognition command to an accepting unit 21 when the HDMI rescue button 31 is pressed by a user.

The remote controller 30 transmits an HDMI option menu display command to the accepting unit 21 when the HDMI option button 32 is pressed by the user.

A response unit 23, a control unit 24, and soon are included in the HDMI receive block 22.

Corresponding format information (display side recognition data) in plural formats corresponding to a format of a video data at the video transmission device 10 side are stored in the EDID memory 25.

For example, data of display specifications such as a video data format, resolution, synchronous frequency, and sound specifications such as a sound data format, sampling frequency: Fs, and bit length, and soon are included as the display side recognition data.

As the resolution of the video data, there are 1920×1080p, 1920×1080i, 1280×720p, 640×480p, 720×480p, 720×480i, 1440×480p (repl) (PAL category addition: 720×576p, 720×576i, 1440×576p (repl)) and so on.

As the formats of the video data, for example, there are the linear PCM, 2 ch (stereo), and so on.

As the Fs, for example, there are 48 kHz/44.1 kHz/32 kHz, and so on.

As the bit length, for example, there are 24 bit/20 bit/16 bit, and so on.

One of these display side recognition data is set as an initial read data.

In this example, for example, 640×480p is set as the resolution as for the video, and the linear PCM, 2 ch (stereo), Fs=44.1 kHz, bit length=16 bit, and so on are set as for the sound as the initial record data.

The response unit 23 replies a response signal (HPD) for a connection signal (5 V) inputted from the video transmission device 10 via the DDC and the initial read data of the EDID memory 25.

The accepting unit 21 is connected to the HDMI receive block 22.

The accepting unit 21 is, for example, an infrared receiving unit and so on, and receives and accepts the display recognition command for the video display device 20 transmitted from the remote controller 30.

The control unit 24 is realized by, for example, the CPU and the memory storing the programs making the CPU execute the processes.

The control unit 24 rewrites the initial read data of the EDID memory 25 into the display side recognition data in another format, and thereafter, resets an output of a response signal (HPD+5 V) from the response unit 23, when the display recognition command is accepted by the accepting unit 21. The EDID memory 25 is one storage area included in the memory.

Incidentally, "reset" means to lower the output of the response signal (HPD+5 V) from Hi to Lo once, and to output again in Hi.

As stated above, the response signal (HPD+5 V) is reset, and thereby, it becomes possible to make the control unit 12 of the video transmission device 10 start the read operation of the display side recognition data again.

In addition, as the reset operation, it may be the operation to lower the output of the response signal (HPD+5 V) from Hi to Lo, and to switch (return) to Hi when a connection signal (5 V) is inputted.

Besides, the response signal may be set to be (HPD of −5 V (Lo output)), and then set to be "0" (zero) V by the reset. As stated above, "reset" means the operation to make the signal change, and the change of the signal other than the above is permissible.

Hereinafter, operations of this video display system are described with reference to FIG. 2 and FIG. 3.

At first, a normal display automatic detection procedure is described with reference to FIG. 2.

Figure 2:
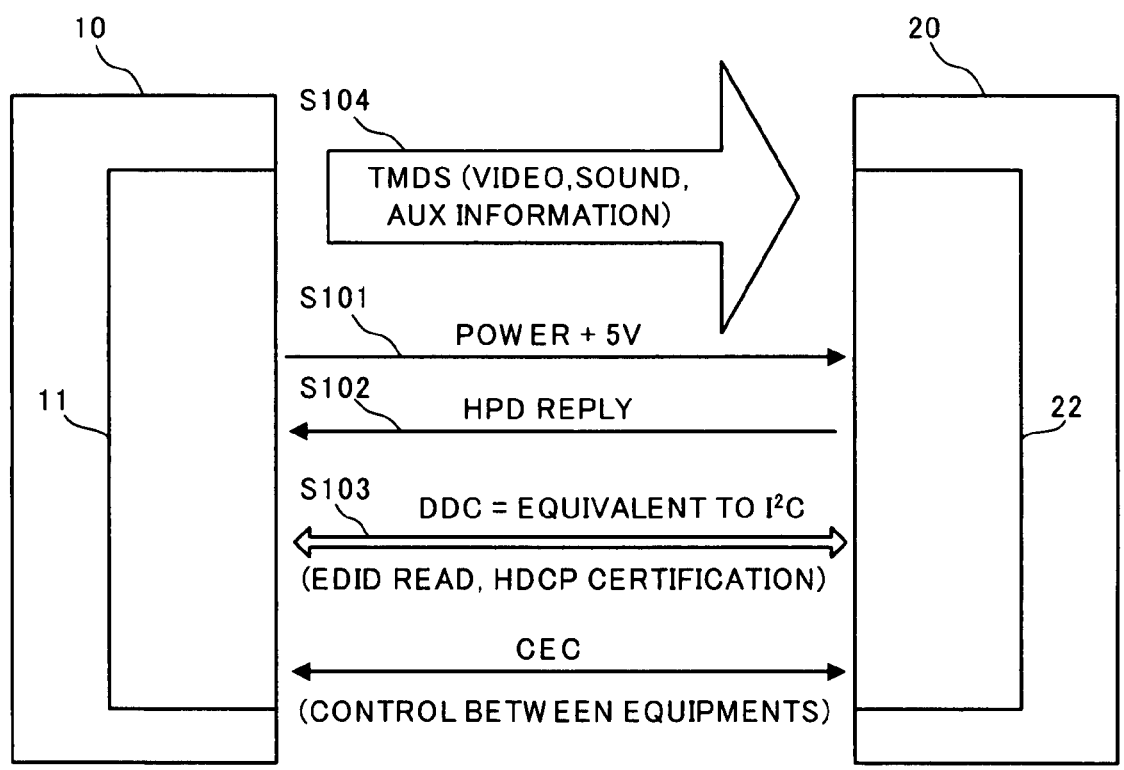
FIG. 2 is a view showing a display automatic detection procedure of this video display system.
Figure 3:
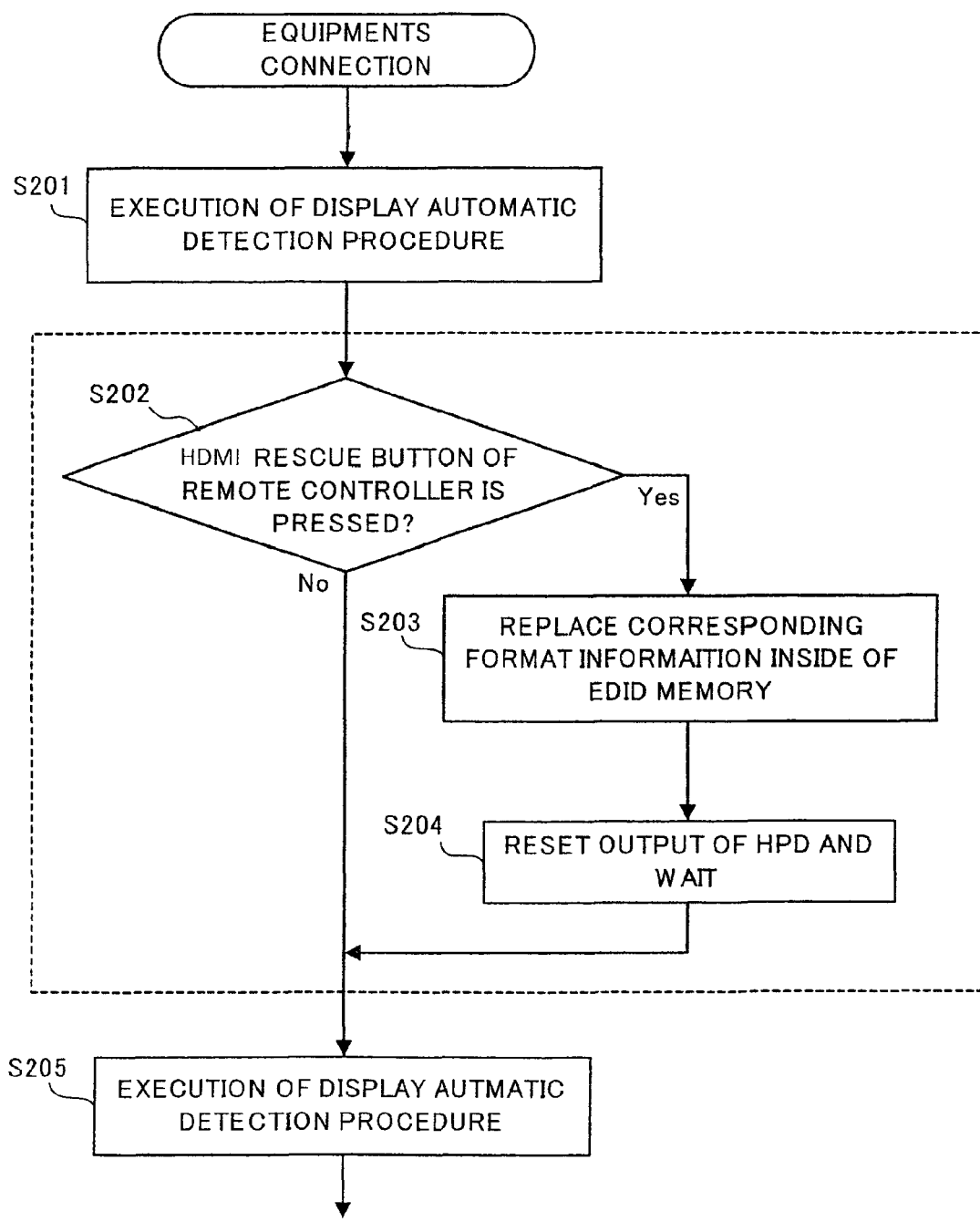
FIG. 3 is a flowchart of a display automatic re-detection operation by a press of an HDMI rescue button of a remote controller.

One end of the HDMI 1 cable is connected to an HDMI terminal of the video transmission device 10, the other end is connected to an HDMI connection terminal of the video display device 20, and a connection signal (power+5 V) is supplied from the control unit 12 to the HDMI receive block 22 of the video display device 20 via a 5 V power line of the HDMI 1, in the video transmission device 10 (S101 in FIG. 2).

At the HDMI receive block 22, the response unit 23 detects that a cable is inserted by the supply of the power of +5 V, replies the response signal of +5 V (HPD+5 V) to the HPD line (S102), to notify the video transmission device 10 that it is in an operation enable state.

Besides, the response unit 23 supplies the supplied power of +5 V to the video processor 26, and thereby, the insertion of the HDMI cable is also detected by the video processor 26, to prepare for the process of the video signal which is transmitted next.

In the video transmission device 10, after the response signal (HPD+5 V) is received, the control unit 12 then specifies an address of the initial read data of the EDID memory 25 of the video display device 20 via the DDC line to read the EDID data (S103).

The control unit 12 obtains information of correspondable format of video and sound at the video display device 20 side, and confirms whether the format of a video data such as the video and sound which is set in the memory of the video transmission device 10 in advance is compatible with the corresponding format at the display side.

Besides, the control unit 12 exchanges data required for a certification of HDCP (High-bandwidth Digital Content Protection) via the DDC line. As the data required for the certification, for example, there is HDCP key information, but in this example, the HDCP key information is stored in the storage area of the HDMI receive block 22.

The control unit 12 of the video transmission device 10 confirms the information of the correspondable format of the video and sound at the video display device 20 side, and performs a certification process.

After that, the control unit 12 transmits signals of the video, sound, AUX information, and so on compatible with the video display device 20 from among the parameters set in the memory in advance, to the video display device 20 via the TMDS line (S104). This signal is called as a TMDS signal.

At the video display device 20, the HDMI receive block 22 receives the transmitted TMDS signal, and outputs a video signal (digital Y, Pb/Pr), synchronous signal (H, V, CK) and digital sound signal.

The video signal is inputted to the following video processor 26 as a digital output.

At the video processor 26, after a brightness correction, scalar process, and so on are performed to the video signal, the video is displayed on the display panel 27.

The sound signal is outputted from the speaker 29 via the D/A 28, an output buffer circuit, and sound process circuits such as a sound process circuit.

There is a case when problems as stated below occur even though the normal HDMI connection procedure is performed.

(1) There is a case when a phenomenon occurs such that video, sound, and so on are not normally outputted caused by reasons such that a transmission/reception timing of information is not matched even if the video, sound, and other formats selected and transmitted by the video transmission device 10 side are the formats supported by the video display device 20.

(2) Besides, there also is a case when the video, sound, and so on are not normally outputted when a user changes the video, sound, and the other format settings of the video transmission device 10, and the connected video display device 20 does not support the formats.

In such a case, conventionally, operations such that a power supply is reset by operating the video transmission device 10, the cable of the HDMI 1 is pulled out/inserted, the user reselects the format which is normally displayed by operating the video transmission device 10, are required in accordance with the phenomenon.

However, even when the operations as stated above are performed, there is a possibility that a state may occur again in which the video and sound are not outputted if the displayable format information inside of the EDID memory 25 is still the same.

Namely, there are cases when the user feels something wrong with the resolution of the video and the sound displayed on the display panel 27 of the video display device 20, turbulence of the video or sound occurs, or the video or sound are not outputted completely, as a result of the normal HDMI connection procedure.

Accordingly, in the video display system of the present embodiment, when the video is not displayed after the execution of the display automatic detection procedure (S201 in FIG. 3), the user presses the HDMI rescue button 31 of the remote controller 30 (S202).

The display recognition command for the video display device 20 is then transmitted from the remote controller 30.

The display recognition command transmitted from the remote controller 30 is received and accepted by the accepting unit 21, the control unit 24 replaces the initial read data of the EDID memory 25 into another format data of correspondable video, sound, and so on (display side recognition data) in an order which is set at the equipment side in advance, and thereafter, the function of the HDMI receive block 22 is reset, and the output of the response signal (HPD+5 V) from the response unit 23 is reset (S204).

The control unit 12 of the video transmission device 10 judges that the HDMI 1 is pulled out and inserted by the reset of the output of the response signal (HPD+5 V), and executes the display automatic detection procedure shown in FIG. 2 again (S205).

At this time, the control unit 12 of the video transmission device 10 transmits the signals of the video and sound in the format corresponding to the changed initial read data because the initial read data of the EDID memory 25 is changed, and therefore, the video and sound are outputted from the video display device 20 with different resolution from the previous time.

As stated above, according to the video display system of the present embodiment, the format data of the correspondable video, sound, and so on (display side recognition data) inside of the EDID memory 25 is changed at the video display device 20 side, and the video, sound, and so on are transmitted by the video transmission device 10 in another format when the phenomenon as above-stated (1) occurs caused by the cable connection of the HDMI 1. Consequently, it becomes possible to avoid defects of the output at the video display device 20 side.

This is effective when the phenomenon of (2) occurs.

Besides, it is conceivable that the video and sound are not outputted normally by performing a description change of the correspondable video format inside of the above-stated EDID memory 25 only once.

Accordingly, the display automatic detection procedure is to be executed plural times after the initial read data is set to a different value by sequentially replacing the format data of the correspondable video, sound, and so on (display side recognition data) every time when the rescue operation of the remote controller 30 is performed.

As for an order, it may be the order which is sequentially lowered from the one having high resolution, or the resolution may be lowered until a screen is displayed on the display panel 27 at the minimum level on a basis of a VGA (640×480).

Incidentally, the present invention is not limited to the above-described embodiment as they are, and in an implementation stage, it can be embodied by modifying components thereof within a range not departing from the spirit of the invention.

Also, the plural components disclosed in the above-described embodiment can be appropriately combined to form various inventions.

Some of all the components shown in the embodiment may be eliminated.

In the above-described embodiment, it is described mainly for the HDMI, but there is a DVI (Digital Visual Interface) and so on as a similar digital interface to the HDMI, and the present invention is also applicable for the above.

Besides, in the above-described embodiment, the change of the format data of the correspondable video, sound, and soon (display side recognition data) inside of the EDID memory 25 is performed in the order set in the equipment side in advance, but it may be changed as the user desires.

In this case, the control unit 24 functions as a menu display unit displaying an HDMI option setting screen 40 (refer to FIG. 4) to change the display side recognition data, when the HDMI option button 32 provided at the remote controller 30 is pressed.

Figure 5:
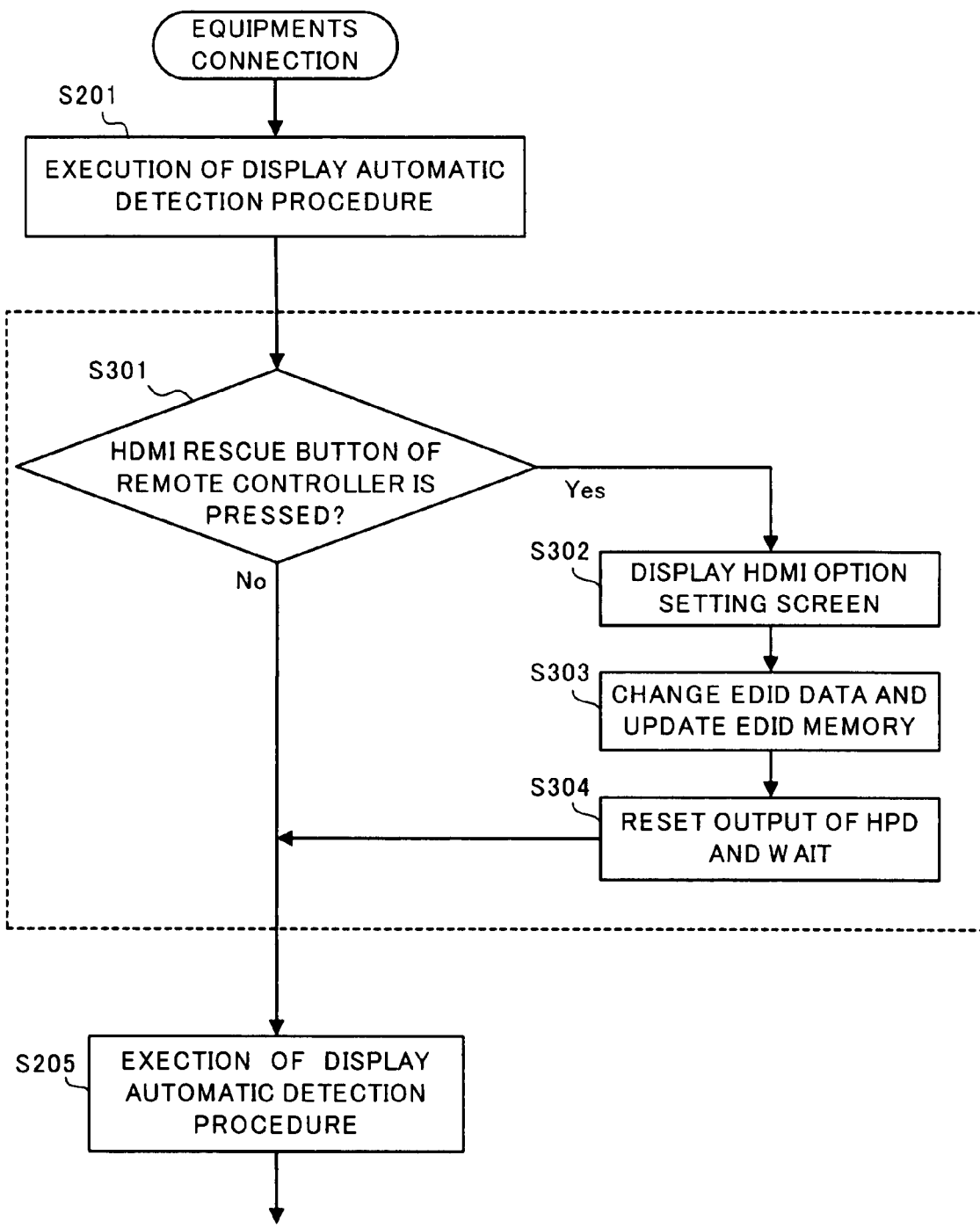
FIG. 5 is a flowchart of the display automatic re-detection operation by a press of an HDMI option button of the remote controller.

For example, when the HDMI option button 32 provided at the remote controller 30 is pressed by the user (S301) as shown in FIG. 5, an HDMI option menu display command is transmitted from the remote controller 30.

Figure 4:
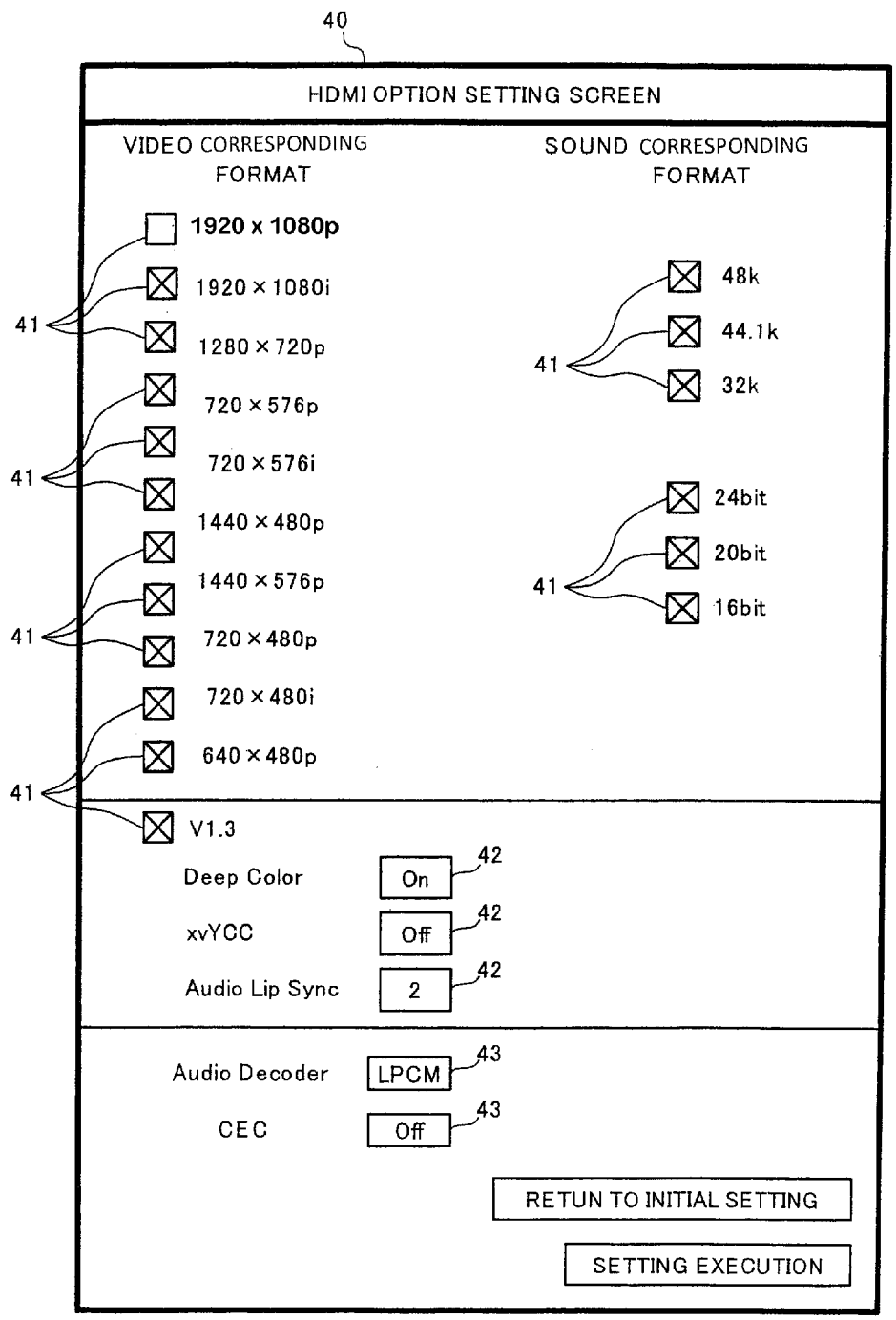
FIG. 4 is a view showing an HDMI option setting screen enabling a setting desired by a user.

When the HDMI option menu display command transmitted from the remote controller 30 is received and accepted by the accepting unit 21, the control unit 24 displays the HDMI option setting screen 40 as shown in FIG. 4 on the display panel 27 (S302).

On the HDMI option setting screen 40, check boxes 41 whether the format data of the correspondable video, sound, and so on (display side recognition data) inside of the EDID memory 25 are used or not, are provided.

Besides, specification fields 42 whether to turn On or Off a color depth (Deep Color), extended color space standard (xvYCC: extended video YCC), audio lip synchronization, and so on defined by a new version of Ver. 1.3 of the HDMI standard, specification fields 43 to use an audio decoder, CEC, and so on are provided on this HDMI option setting screen 40.

The user inputs "On", "Off", numerical value, or the like to these specification fields 42 and 43, and thereby, a desired display setting can be performed.

The "Deep Color" is the one in which the number of colors displayable by one pixel is shown by a bit display, and it is increased from a conventional 24 bit to 48 bit (30 bit/36 bit/48 bit) in RGB in the new version of Ver. 1.3 of the HDMI standard.

The "xvYCC" is a color space standard in which a color space is enlarged while securing a compatibility with a color gamut of 1TU-R BT. 709 (equivalent to sRGB) used by an HDTV, and there is a possibility that the video transmission device 10 corresponding to such HDMI extended standard may be commercialized in the future.

When the user uses the video display device 20 in advance, it is possible to correspond to the video transmission device 10 which is released later.

Namely, the specification fields 42 are accepting units to accept instructions to enable/disable the "Deep Color", "xvYCC", and so on being extended standards in the future.

"On" or "Off" is inputted to this specification field 42, and thereby, a parameter of this menu is set in the memory, and it is reflected on the later display automatic detection procedure and a display operation after the equipment connection.

Accordingly, the user can set the formats of the video and sound into desired formats to a nicety in detail.

Namely, when the format data of the video, sound, and so on (display side recognition data) are specified by this change operation from this HDMI option setting screen 40, and a setting execution button is operated, the control unit 24 changes the EDID data inside of the EDID memory 25, and updates the EDID memory 25 (S303).

Subsequently, the control unit 24 resets inside of the HDMI receive block 22, resets the output of the HPD from the response unit 23, and waits for the reading of the EDID data from the video transmission device 10 (S304).

Accordingly, the video transmission device 10 side detects that the connection of the HDMI 1 is released once, and the display automatic detection procedure is executed again by the video transmission device 10 (S205).

Namely, it is possible to change a transmission format of the video and sound into a desired format for the user by making the video transmission device 10 read a different EDID data from the data when some defect occurs.

Incidentally, when the formats of the displayable video, sound, and soon inside of the EDID memory 25 are changed as an example, contents of "Detailed Timing Description #1" which is cited as a first recommended format of a display equipment is to be changed as for the video.

Besides, as for the sound, "Audio Tag" is to be changed.

Normally, maximum resolution information of the display equipment is often written in the EDID memory 25, and therefore, it becomes possible to avoid the defect that the video is not displayed by rewriting the maximum resolution information to another low resolution information.

Besides, it is also possible to change another "Detailed Timing Description" if necessary.

OTHER EMBODIMENTS

Embodiments of the present invention can be expanded/modified without being limited to the above-described embodiments, and such expanded/modified embodiments are also included in the technical scope of the present invention.

What is claimed is:

1. A video display device which is connected to a video transmission device via a High Definition Multimedia Interface (HDMI), the video display comprising:

a memory configured to store display side recognition data in plural formats corresponding to a format of a display data at the video transmission device side, one of the display side recognition data being set as an initial read data;

a response unit configured to send a response signal to the video transmission device in response to a connection signal inputted from the video transmission device via the HDMI interface when the video display device is connected to the video transmission device via the HDMI interface, and to send the initial read data of said memory after sending the response signal to the video transmission device;

an accepting unit to receive a display recognition command inputted from an external device; and a control unit configured to control the response unit to reset an output of the response signal after changing the initial read data to another display side recognition data in another format in said memory in response to receipt of the display recognition command by said accepting unit, and then to resend the response signal to the video transmission device in response to the connection signal inputted from the video transmission device again and to resend the changed initial read data.

2. The video display device according to claim 1, wherein the external device comprises a remote control to transmit the display recognition command to said accepting unit by an operation of a user.

3. The video display device according to claim 2, further comprising
a menu display unit displaying an HDMI option menu changing the display side recognition data when an HDMI option button provided at said remote control is pressed.

4. The video display device according to claim 3, wherein the HDMI option menu provides a accepting unit accepting an instruction to enable or disable a color depth.

5. The video display device according to claim 3, wherein the HDMI option menu provides a accepting unit accepting an instruction to enable or disable an extended color space standard.

6. A video display system in which a video transmission device and a video display device are connected via a High Definition Multimedia Interface (HDMI), the video transmission device comprising:
a transmission side control unit configured to transmit a connection signal via the HDMI interface when the video display device is connected to the video transmission device via the HDMI interface, and to transmit a compatible video data to the video display device from among the video data set in a memory at a transmission side in accordance with a replied response signal and display side recognition data; and
wherein the video display device comprises:
a memory at a display side configured to store the display side recognition data in plural formats corresponding to a format of the video data at the video transmission device side, one of the display side recognition data being set as an initial read data;
a response unit configured to send a response signal in response to a connection signal inputted from the video transmission device via the HDMI interface to the video transmission device, and to send the initial read data of said memory at the display side after sending the response signal to the video transmission device;
an accepting unit configured to receive a display recognition command inputted from an external device; and
a display side control unit configured to control the response unit to reset an output of the response signal after changing the initial read data to another display side recognition data in another format in said memory at the display side in response to receipt of the display recognition command by said accepting unit, and then to resend the response signal to the video transmission device in response to the connection signal inputted from the video transmission device again and then to resend the changed initial read data.

7. A video display method in a video display system configured to connect a video transmission device and a video display device via a High Definition Multimedia Interface (HDMI), the video display method comprising:
receiving, by the video display device, a connection signal from the video transmission device via the HDMI interface;
sending, by the video display device, a response signal to the video transmission device in response to the connection signal receive via the HDMI interface when the video display device is connected to the video transmission device via the HDMI interface, and one data set in advance from among display side recognition data in plural formats stored in a memory at a display side as an initial read data corresponding to a format of a video data at the video transmission device side;
receiving, by the video display device, a compatible video data to the video display device from among the video data set in a memory at a transmission side in accordance with the received response signal and initial read data;
receiving, by the video display device, a display recognition command inputted from an external device; and
resetting an output of the response signal by the video display device after changing the initial read data to another display side recognition data in another format in the memory at the display side in response to receipt of the display recognition command by the video display device, and resending the response signal to the video transmission device in response to the connection signal inputted from the video transmission device again and then resending the changed initial read data.

8. The video display method according to claim 7, wherein the external device transmitting the display recognition command to said video display device comprises a remote control operated by a user.

9. The video display method according to claim 8, further comprising
displaying an HDMI option menu changing the display side recognition data when an HDMI option button provided at said remote control is pressed.

10. The video display method according to claim 9, further comprising
displaying a field for accepting an instruction to enable or disable a color depth in the HDMI option menu.

11. The video display method according to claim 9, further comprising
displaying a field for accepting an instruction to enable or disable an extended color space standard in the HDMI option menu.

* * * * *